（12） United States Patent
Matsunaga

(10) Patent No.: US 8,197,272 B2
(45) Date of Patent: Jun. 12, 2012

(54) CONNECTOR

(75) Inventor: Akihiro Matsunaga, Tokyo (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 0 days.

(21) Appl. No.: 12/767,927

(22) Filed: Apr. 27, 2010

(65) Prior Publication Data

US 2010/0210128 A1   Aug. 19, 2010

Related U.S. Application Data

(63) Continuation of application No. PCT/JP2008/050578, filed on Jan. 18, 2008.

(30) Foreign Application Priority Data

Oct. 31, 2007 (JP) .................................. 2007-284323

(51) Int. Cl.
*H01R 13/62* (2006.01)
(52) U.S. Cl. ..................... 439/160; 439/630; 439/923
(58) Field of Classification Search ................. 439/923, 439/152, 153, 155–160, 630
See application file for complete search history.

(56) References Cited

U.S. PATENT DOCUMENTS

| 6,027,350 | A  | * | 2/2000 | Chen et al. ............. 439/159 |
| 6,394,827 | B2 | * | 5/2002 | Nogami ................. 439/159 |
| 6,966,786 | B1 | * | 11/2005 | Motojima et al. ........ 439/159 |
| 7,011,537 | B1 | * | 3/2006 | Wu ..................... 439/159 |
| 7,014,508 | B2 | * | 3/2006 | Tsai .................... 439/630 |
| 7,427,206 | B2 | * | 9/2008 | Takei et al. ............. 439/159 |

FOREIGN PATENT DOCUMENTS

| JP | 2000-357210 A | 12/2000 |
| JP | 2001-351735 A | 12/2001 |
| JP | 2005-268089 A | 9/2005 |
| JP | 2005-301983 A | 10/2005 |

* cited by examiner

*Primary Examiner* — Felix O Figueroa
(74) *Attorney, Agent, or Firm* — Holtz, Holtz, Goodman & Chick, PC

(57) ABSTRACT

A connector includes a housing that holds contacts, a cover that covers the housing, and an ejection member that is movably held by the housing and the cover and ejects a SIM card inserted between the housing and the cover. The cover is formed with a spring portion that pushes the ejection member toward the housing, and the ejection member is formed with a groove that receives the spring portion in a relatively movable manner.

8 Claims, 13 Drawing Sheets

CONNECTOR

This application is a continuation of prior International Application No. PCT/JP2008/050578, filed Jan. 18, 2008.

FIELD OF THE INVENTION

The present invention relates to a connector comprising an ejection mechanism.

BACKGROUND ART

Conventionally, there has been proposed a SIM (Subscriber Identity Module) card connector comprising a base, an ejection member, and a cover (see Japanese Laid-Open Patent Publication (Kokai) No. 2000-357210).

The base is substantially plate-shaped and holds contacts. The base includes a first side wall, a second side wall, and a rib. The first side wall is located on one side of the base, and the second side wall is located on the other side of the base. The first side wall and the second side wall are parallel to each other. The first and second side walls each have a height slightly larger than the thickness of the SIM card. The rib is located in the vicinity of the second side wall and extends parallel to the second side wall. The length of the rib is shorter than the lengths of the first and second side walls, and the height of the rib is the same as the heights of the first and second side walls.

The SIM card is inserted between the first side wall and the rib. In a card support surface of the base, a recess is formed along the second side wall. In the recess, the ejection member is disposed such that it is capable of sliding parallel to the movement direction of the SIM card.

The ejection member is substantially bar-shaped. A first protruding portion is formed on one end of the ejection member. The first protruding portion is an operation portion that is pinched by a finger to cause the ejection member to slide.

An L-shaped second protruding portion is formed on the other end of the ejection member. An L-shaped third protruding portion is formed on the one end of the ejection member such that it is adjacent to the first protruding portion. The second protruding portion and the third protruding portion sandwich the SIM card in the movement direction of the SIM card.

The cover bridges the base from an upper end of the first side wall to an upper end of the second side wall.

To connect the SIM card to the connector, in a state in which the ejection member is pulled out, the SIM card is disposed between the second protruding portion and the third protruding portion of the ejection member, and the ejection member is pushed into the base.

As a result, the SIM card is inserted into the connector together with the ejection member, and at the same time, brought into contact with the contacts held by the base.

To remove the SIM card from the connector, it is only required that the ejection member be pulled out. When the ejection member is pulled out, one end surface of the SIM card catches on the second protruding portion of the ejection member, whereby the SIM card is pulled out together with the ejection member.

DISCLOSURE OF THE INVENTION

Problem to be Solved by the Invention

As described above, since the ejection member is merely movably accommodated in a space surrounded by the second side wall and the rib of the base and the cover, when the ejection member is caused to slide, looseness thereof can be caused.

To reduce the looseness of the ejection member, a gap between the ejection member and the cover and a gap between the ejection member and the second side wall or the rib need to be reduced. To realize this, it is necessary to manufacture and assemble three components, i.e. the base, the ejection member, and the cover with high precision, which increases manufacturing costs.

The present invention has been made in view of these circumstances, and an object thereof is to provide a connector which is capable of reducing the manufacturing costs and the looseness of an ejection member.

To attain the object, the invention according to claim 1 provides a connector comprising a housing that holds contacts, a cover that covers the housing, and an ejection member that is movably held by the housing and the cover and ejects a card-type electronic component inserted between the housing and the cover, wherein the cover includes a spring portion that urges the ejection member toward the housing, and the ejection member includes a main body portion that is substantially bar-shaped, an abutment portion that is formed on one end of the main body portion and is brought into abutment with a front end of the card-type electronic component when ejecting the card-type electronic component, an operation portion that is formed on the other end of the main body portion and performs an operation for ejecting the card-type electronic component, and a groove that is formed in the main body portion and receives the spring portion of the cover in a relatively movable manner.

As described above, the cover includes the spring portion that pushes the ejection member toward the housing, and the ejection member includes the groove that receives the spring portion of the cover in a relatively movable manner. Therefore, when the ejection member moves in an inserting or ejecting direction of the card-type electronic component, the spring force of the spring portion of the cover acts on the ejection member on the housing, thereby reducing the looseness of the ejection member. Accordingly, it is not necessary to improve the dimensional precision and the assembly precision of the housing, the cover, and the ejection member in order to reduce the looseness of the ejection member, and hence it is possible to reduce an increase in the manufacturing costs of the connector as a whole.

Preferably, the groove is formed with a stopper portion that limits a movement of the ejection member in an ejecting direction of the card-type electronic component to a predetermined amount.

Preferably, the groove is formed with a protruding portion that increases an elastic deformation amount of the spring portion of the cover when the ejection member is pushed in an inserting direction of the card-type electronic component by not less than a predetermined amount.

Preferably, the cover includes a cover-side guide portion that guides the ejection member in an inserting or ejecting direction of the card-type electronic component.

Preferably, the housing includes a housing-side guide portion that guides the ejection member in an inserting or ejecting direction of the card-type electronic component, and the ejection member includes a guide groove into which the housing-side guide portion is inserted.

Effects of the Invention

According to the present invention, it is possible to reduce the costs and to reduce the looseness of the ejection member.

BEST MODE FOR CARRYING OUT THE INVENTION

Hereafter, an embodiment of the present invention will be described with reference to the drawings.

FIG. 1 is a perspective view of a card connector according to one embodiment of the present invention. FIG. 2 is an exploded perspective view of the card connector shown in FIG. 1. FIG. 3 is a front elevational view of the card connector shown in FIG. 1. FIG. 4 is a plan view of the card connector shown in FIG. 1 in a state in which a SIM card is going to be connected thereto. FIG. 5A is a perspective view of the card connector shown in FIG. 1 in a state in which the SIM card is going to be connected thereto. FIG. 5B is an enlarged perspective view of a VB portion shown in FIG. 5A. FIG. 6 is a perspective view of an ejection member of the card connector shown in FIG. 1.

As shown in FIGS. 1 to 4, the card connector (connector) 1 is a connector for a SIM card (card-type electronic device) 20 and comprises a housing 3, contacts 5, a cover 7, and an ejection member 9.

The housing 3 includes a housing main body 31, a first side wall portion 32, a second side wall portion 33, and a rear wall portion 34, and is formed of an insulating resin. The housing main body 31 is substantially plate-shaped. The housing main body 31 is formed with a plurality of holes 31a arranged in two rows. The housing main body 31 is formed with a guide portion (housing-side guide portion) 31b, which is substantially key-shaped, along the first side wall portion 32 (see FIG. 5B). The guide portion 31b is located in the vicinity of the first side wall portion 32.

The first side wall portion 32 is formed on one side of the housing main body 31. An engagement projection 32a is formed on an outer surface of a front end portion of the first side wall portion 32. The engagement projection 32a is substantially L-shaped. A recess 32b is formed in an outer surface of a rear end portion of the first side wall portion 32. The recess 32b extends along the longitudinal direction of the first side wall portion 32.

The second side wall portion 33 is formed on the other side of the housing main body 31. The second side wall portion 33 has a similar structure to that of the first side wall portion 32, and an engagement projection 33a is formed on an outer surface of a front end portion of the second side wall portion 33. The engagement projection 33a is substantially L-shaped. A recess (not shown) is formed in an outer surface of a rear end portion of the second side wall portion 33, extending along the longitudinal direction of the second side wall portion 33.

The rear wall portion 34 is formed on a rear portion of the housing main body 31.

Each of the contacts 5 includes a contact portion 51, a spring portion 52, a fixing portion 53, and a terminal portion 54 (see FIG. 2). The contact portion 51 is brought into contact with a pad (not shown) provided on the SIM card 20. The spring portion 52 is connected to the contact portion 51 and presses the contact portion 51 against the pad of the SIM card 20. The fixing portion 53 is connected to the spring portion 52. The terminal portion 54 is connected to the fixing portion 53. The terminal portion 54 is soldered onto a pad of a printed circuit board, not shown. The contact portion 51, the spring portion 52, and part of the fixing portion 53 are accommodated in an associated one of the holes 31a of the housing main body 31. Most part of the fixing portion 53 is buried in the housing main body 31. The terminal portion 54 protrudes frontward from a front portion of the housing main body 31.

As shown in FIGS. 2, 4, 5A, and 5B, the cover 7 includes a cover main body 71, a first side wall portion 72, a second side wall portion 73, and a rear wall portion 74, and is formed by blanking and bending a metal plate.

The cover main body 71 is substantially plate-shaped. The cover main body 71 is formed with a spring portion 71a. The spring portion 71a is located in the vicinity of the first side wall portion 72 and extends along the longitudinal direction thereof. A projecting piece 71b is formed in a front portion of the cover main body 71. The projecting piece 71b is located in the vicinity of the first side wall portion 72. The projecting piece 71b is formed with a guide portion (cover-side guide member) 71c. The guide portion 71c is substantially plate-shaped. A guide portion (cover-side guide member) 71d is formed in a rear portion of the cover main body 71. The guide portion 71d is substantially plate-shaped. The guide portions 71c and 71d are aligned on a single straight line and located in the vicinity of the first side wall portion 72. The guide portions 71c and 71d guide the ejection member 9 along the longitudinal direction of the first side wall portion 72. Also, the guide portions 71c and 71d guide the SIM card 20 in an inserting direction I and an ejecting direction E (see FIG. 4), in concert with the second side wall portion 33 of the housing 3.

The cover main body 71 is formed with a plurality of holes 71e arranged in two rows. When the cover 7 is mounted on the housing 3, the holes 71e are opposed to the holes 31a of the housing 3, respectively.

The first side wall portion 72 is formed on one side of the cover main body 71. When the cover 7 is mounted on the housing 3, the first side wall portion 72 covers the first side wall portion 32 of the housing 3. An engagement piece 72a is formed on a front portion of the first side wall portion 72. The engagement piece 72a extends along the longitudinal direction of the first side wall portion 72. A spring piece 72b is formed on a rear portion of the first side wall portion 72. The spring piece 72b extends along the longitudinal direction of the first side wall portion 72. The front portion and the rear portion of the first side wall portion 72 are each formed with a leg piece 72c.

The second side wall portion 73 is formed on the other side of the cover main body 71. When the cover 7 is mounted on the housing 3, the second side wall portion 73 covers the second side wall portion 33 of the housing 3. An engagement piece 73a is formed on a front portion of the second side wall portion 73. The engagement piece 73a extends along the longitudinal direction of the second side wall portion 73. A spring piece (not shown, having the same shape as that of the spring piece 72b of the first side wall portion 72), not shown, is formed on a rear portion of the second side wall portion 73. The spring piece extends along the longitudinal direction of the second side wall portion 73. The front portion and the rear portion of the second side wall portion 73 are each formed with a leg piece 73c (see FIG. 4).

By soldering the leg pieces 72c and 73c onto respective pads, not shown, of the printed circuit board, the card connector 1 is fixed to the printed circuit board.

The rear wall portion 74 is formed on a rear portion of the cover main body 71. When the cover 7 is mounted on the housing 3, the rear wall portion 74 covers the rear wall portion 34 of the housing 3.

As shown in FIG. 6, the ejection member 9 is substantially bar-shaped and includes a main body portion 91, an abutment portion 92, an operation button (operation portion) 93, and a groove 94. The ejection member 9 is formed of an insulating resin.

The main body portion 91 is substantially prism-shaped. A guide groove 95 is formed in a bottom surface of the main body portion 91. The guide groove extends along the longitudinal direction of the main body portion 91 and receives the guide portion 31*b* of the housing 3 in a relatively movable manner. The guide portion 31*b* is inserted into the guide groove 95, whereby the ejection member 9 is guided along the first side wall portion 32. Further, the guide groove 95 and the guide portion 31*b* are engaged with each other, whereby the looseness of the ejection member 9 (looseness in a width direction W (see FIG. 1) of the card connector 1) is reduced.

The abutment portion 92 is formed on one end of the main body portion 91. The abutment portion 92 extends in a direction perpendicular to the longitudinal direction of the main body portion 91. The abutment portion 92 is brought into abutment with a front end surface of the SIM card 20.

The operation button 93 is formed on the other end of the main body portion 91. The operation button 93 is thicker than the main body portion 91. The operation button 93 includes a projecting portion 93*a* that protrudes upward.

The groove 94 is formed in an upper surface of the main body portion 91 (see FIGS. 6, 8A, 8B, 9A, and 9B). The groove 94 extends in the longitudinal direction of the main body portion 91. The groove 94 includes a starting end 94*a* and a terminating end 94*b*. The terminating end 94*b* is a surface substantially perpendicular to the upper surface of the main body portion 91 and is a stopper portion brought into abutment with a front end of the spring portion 71*a* of the cover 7 to limit a movement amount of the ejection member 9. A bottom surface of the groove 94 is in constant contact with the front end of the spring portion 71*a* of the cover 7. A protruding portion 94*c* is formed on the bottom surface of the groove 94, for increasing an elastic deformation amount of the spring portion 71*a*. A steeply sloped surface is formed on a rear side (engaging portion 92 side) of the protruding portion 94*c*, and a gently sloped surface is formed on a front side of the protruding portion 94*c*.

To assemble the card connector 1, first, a front portion of the cover 7 is placed on a rear portion of the housing 3 holding the contacts 5, to allow the cover 7 to slide toward a front portion of the housing 3. As a result, the engagement pieces 72*a* and 73*a* of the cover 7 are respectively engaged with the engagement projections 32*a* and 33*a* of the housing 3, and at the same time, front end portions of the spring pieces 72*b* of the first and second side wall portions 72 and 73 of the cover 7 are respectively engaged with the recesses 32*b* of the first and second side wall portions 32 and 33 of the housing 3. Thus, the cover 7 is fixed to the housing 3.

Then, the ejection member 9 is inserted into an accommodation space S (see FIG. 3) formed between the housing 3 and the cover 7. In doing so, the guide portion 31*b* of the housing 3 is caused to go into the guide groove 95 formed in the bottom surface of the ejection member 9.

When the ejection member 9 is inserted into the accommodation space S, the spring portion 71*a* of the cover 7 is inserted into the groove 94 of the ejection member 9. Once the spring portion 71*a* is in the groove 94, even if an attempt is made to cause the ejection member 9 to move in the ejecting direction E of the SIM card 20 by a predetermined amount or more, the terminating end 94*b* of the groove 94 is brought into abutment with the front end of the spring portion 71*a*, whereby the ejection member 9 is prevented from dropping off.

As described above, the card connector 1 is assembled. It should be noted that before the cover 7 is mounted on the housing 3, the ejection member 9 may be disposed in the housing 3, and then the cover 7 may be mounted on the housing 3.

FIG. 7A is a cross-sectional view of the card connector shown in FIG. 1 in a state before the SIM card is connected thereto. FIG. 7B is an enlarged cross-sectional view of the card connector in the same state as that shown in FIG. 7A. FIG. 8A is a cross-sectional view of the card connector shown in FIG. 1 in a state in which the SIM card is connected thereto. FIG. 8B is an enlarged cross-sectional view of the card connector in the same state as that shown in FIG. 8A. FIG. 9A is a perspective view of the card connector shown in FIG. 1 in a state before the SIM card connected thereto is pulled out. FIG. 9B is a perspective view of the card connector in a state in which the SIM card is pulled out therefrom.

To connect the SIM card 20 to the card connector 1, first, the operation button 93 is pinched by a finger F to pull out the ejection member 9 from the accommodation space S. In doing so, the ejection member 9 is guided by the guide portions 71*c*, 71*d*, and 31*b*, and the first side wall portion 32 of the housing 3 in the ejecting direction E. When the ejection member 9 is pulled out by the predetermined amount, the terminating end 94*b* of the groove 94 of the ejection member 9 is brought into abutment with the front end of the spring portion 71*a* of the cover 7, whereby the movement of the ejection member 9 is limited (see FIG. 7B).

In this state, the SIM card 20 is inserted into the accommodation space S (see FIG. 7A). In doing so, the front end surface of the SIM card 20 is brought into abutment with the engaging portion 92 of the ejection member 9 and urges the engaging portion 92 toward the depth of the accommodation space S, and therefore the ejection member 9 moves toward the depth of the accommodation space S together with the SIM card 20.

When the ejection member 9 is inserted into the accommodation space S by a predetermined amount, the operation button 93 is brought into abutment with the projecting piece 71*b* of the cover 7, whereby the movement of the ejection member 9 is limited, and at the same time, the movement of the SIM card 20 also stops. In this state, terminal portions (not shown) of the SIM card 20 are brought into contact with the contact portions 51 of the contacts 5 with a predetermined contact force, and the SIM card 20 is electrically connected to the printed circuit board via the contacts 5.

While the ejection member 9 is moving, the spring portion 71*a* of the cover 7 is in contact with the bottom surface of the groove 94 of the ejection member 9, whereby the looseness of the ejection member 9 in a height direction H (see FIG. 1) of the card connector 1 is reduced.

Further, as described above, the guide groove 95 of the ejection member 9 and the guide portion 31*b* of the housing 3 are engaged with each other, whereby the looseness of the ejection member 9 in the width direction W (see FIG. 1) of the card connector 1 is reduced.

Just before the operation button 93 is brought into abutment with the projecting piece 71*b* of the cover 7, the spring portion 71*a* of the cover 7 relatively climbs onto the projecting portion 94*c* of the groove 94 of the ejection member 9 (see FIGS. 8A and 8B). As a result, the elastic deformation amount of the spring portion 71*a* increases and the spring force thereof becomes large, causing a contact resistance to become large, and making it difficult for the ejection member 9 to move. By this, the electrical connection between the SIM card 20 and the printed circuit board becomes difficult to be broken by an accidental motion of the ejection member 9.

To remove the SIM card 20 connected to the card connector 1, as shown in FIG. 9A, the operation button 93 of the ejection member 9 is pinched by the finger F, and as shown in FIG. 9B, the ejection member 9 may be pulled out.

According to the present embodiment, it is possible to reduce the looseness of the ejection member 9, especially in the height direction H of the card connector 1, by the spring portion 71a of the cover 7.

The spring portion 71a of the cover 7 and the groove 94 of the ejection member 9 each have a simple shape, making it possible to easily fabricate them, whereby an increase in manufacturing costs can be reduced.

Further, it is possible to prevent the looseness of the ejection member 9 in the width direction by the guide portion 31b of the housing 3.

Also, since the ejection member 9 can be mounted on the housing 3 either before or after the cover is mounted on the housing 3, if the ejection member 9 is mounted on the housing 3 after the housing 3 of the card connector 1 is mounted on the printed circuit board, it is possible to use an inexpensive resin that is not resistant to heat, as a material for the ejection member 9.

It should be noted that although in the above-described embodiment, the terminating end 94b is formed in the groove 94 as a stopper portion that limits the movement of the ejection member 9 in the ejecting direction E of the SIM card 20 to the predetermined amount or less, it is not necessarily required to form the stopper portion in the groove 94.

Further, although in the groove 94, there is formed the protruding portion 94c that increases the elastic deformation amount of the spring portion 71a of the cover 7 when the ejection member 9 is pushed in the inserting direction I of the SIM card 20 by the predetermined amount or more, it is not necessarily required to form the protruding portion 94c.

It should be noted that although in the above-described embodiment, the housing 3 is provided with the guide portion 31b, and the cover 7 is provided with the guide portions 71c and 71d, the guide portion for the ejection member 9 may be either that provided in the housing 3 or those provided in the cover 7.

Figure 1:
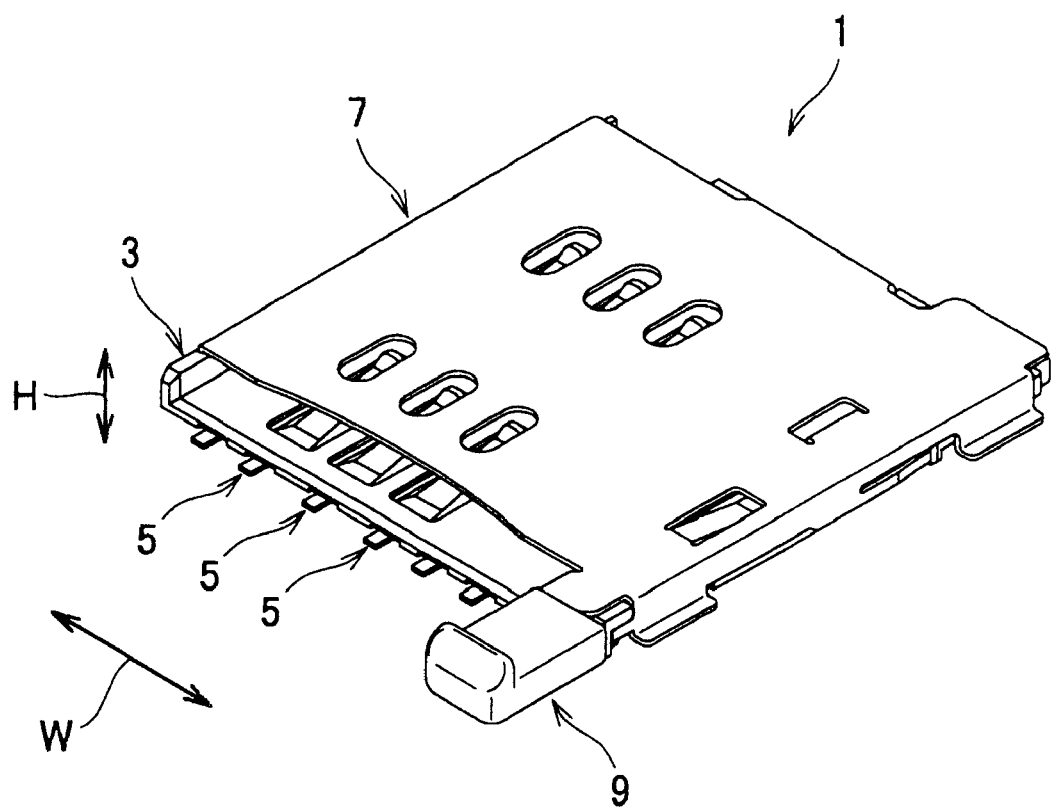
FIG. 1 is a perspective view of a card connector according to one embodiment of the present invention.
Figure 2:
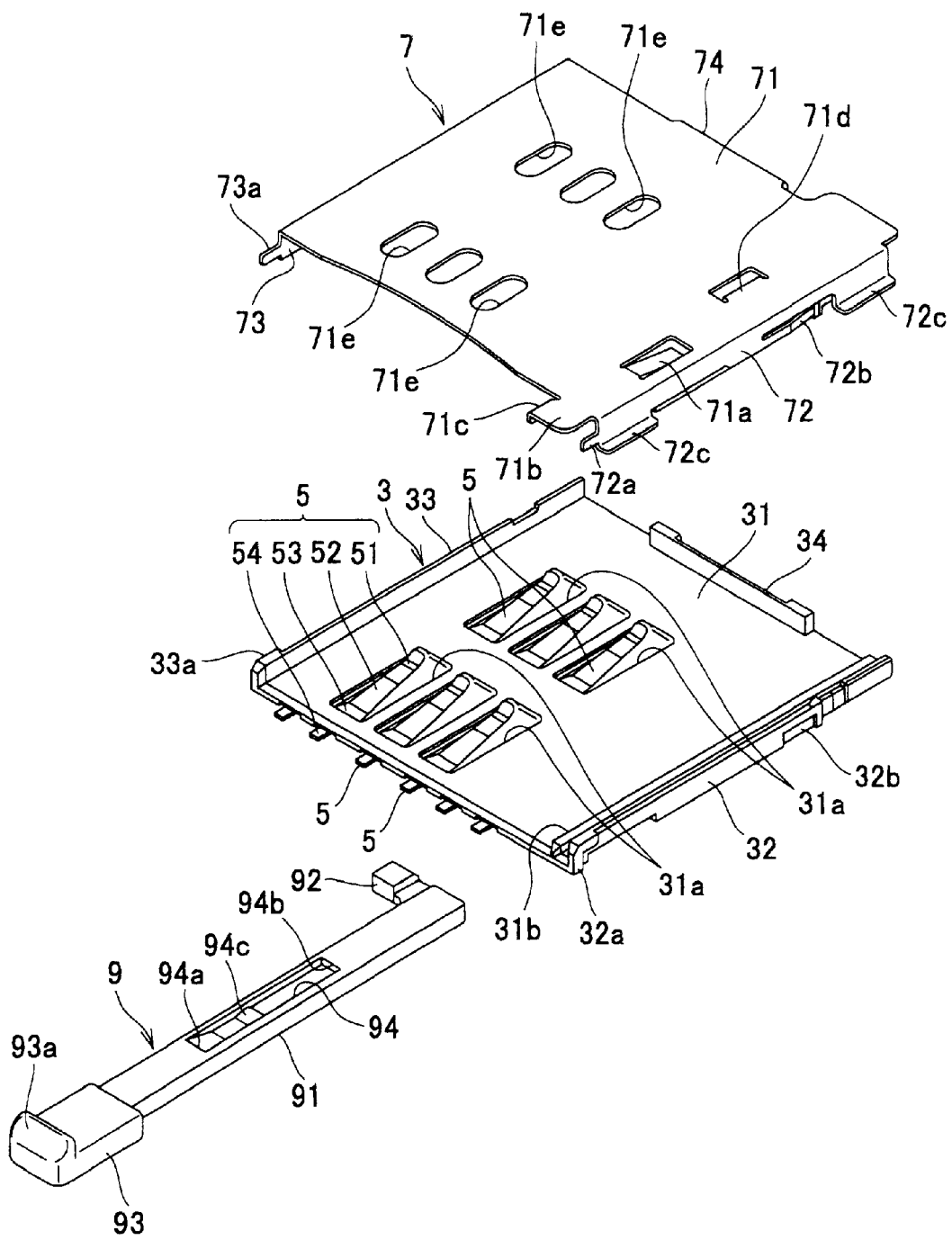
FIG. 2 is an exploded perspective view of the card connector shown in FIG. 1.
Figure 3:
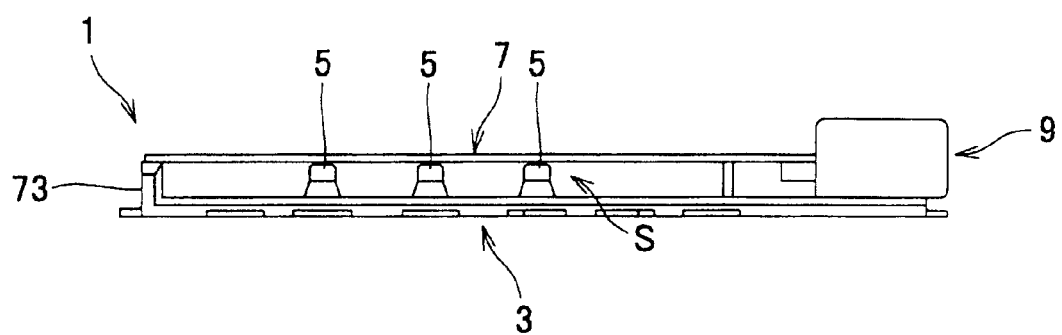
FIG. 3 is a front elevational view of the card connector shown in FIG. 1.
Figure 4:
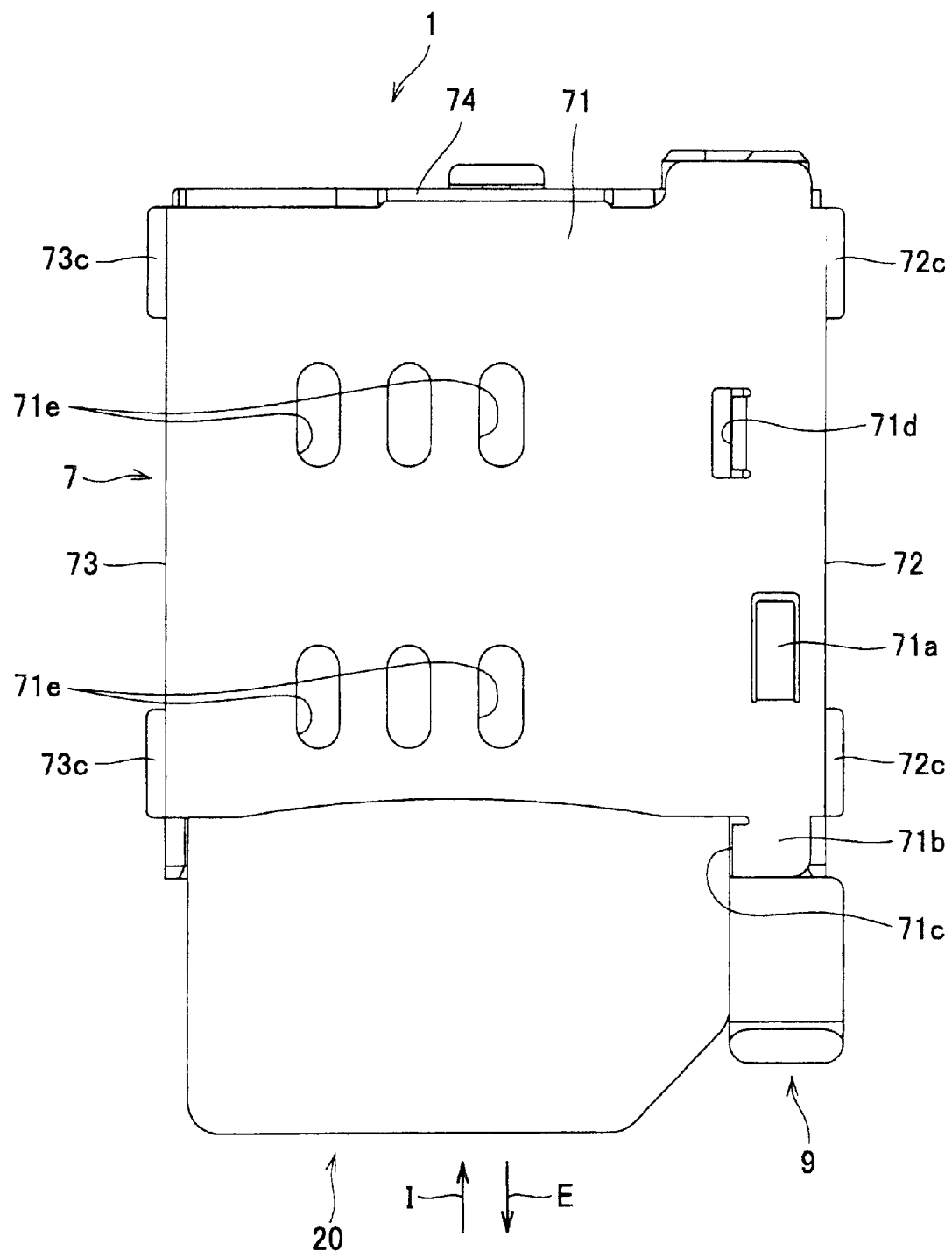
FIG. 4 is a plan view of the card connector shown in FIG. 1 in a state in which a SIM card is connected thereto.
Figure 5A:
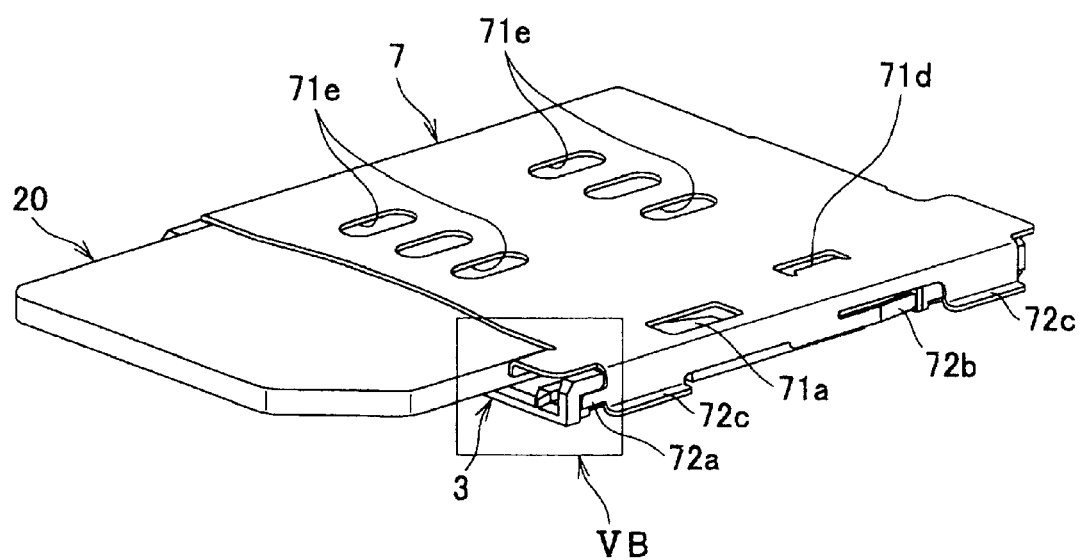
FIG. 5A is a perspective view of the card connector shown in FIG. 1 in a state in which the SIM card is going to be connected thereto.
Figure 5B:
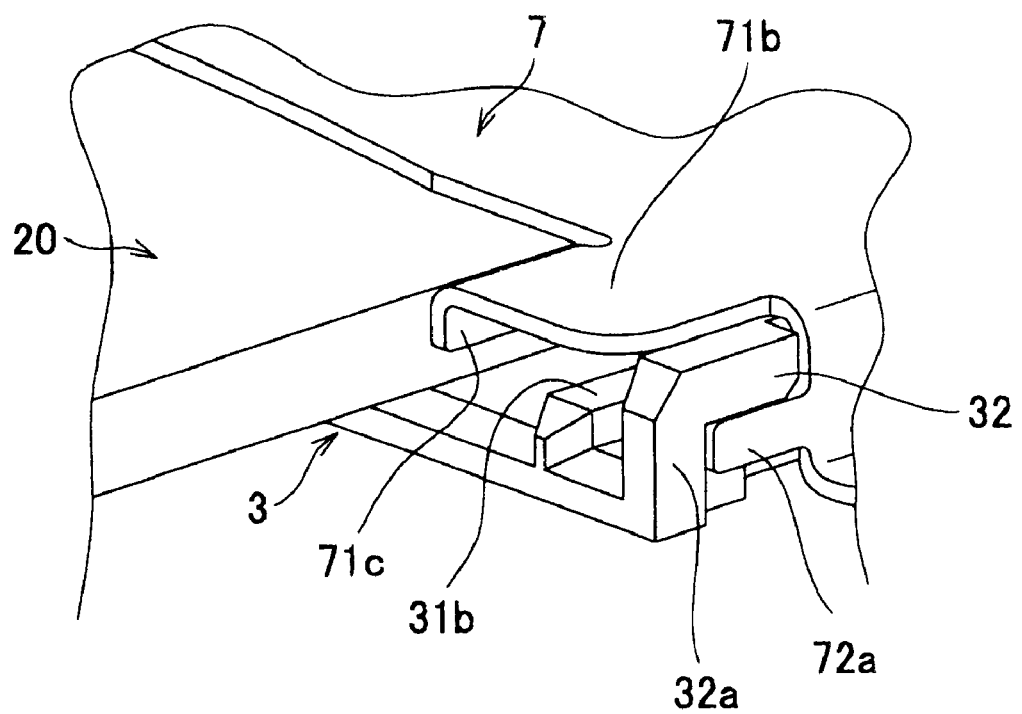
FIG. 5B is an enlarged perspective view of a VB portion shown in FIG. 5A.
Figure 6:
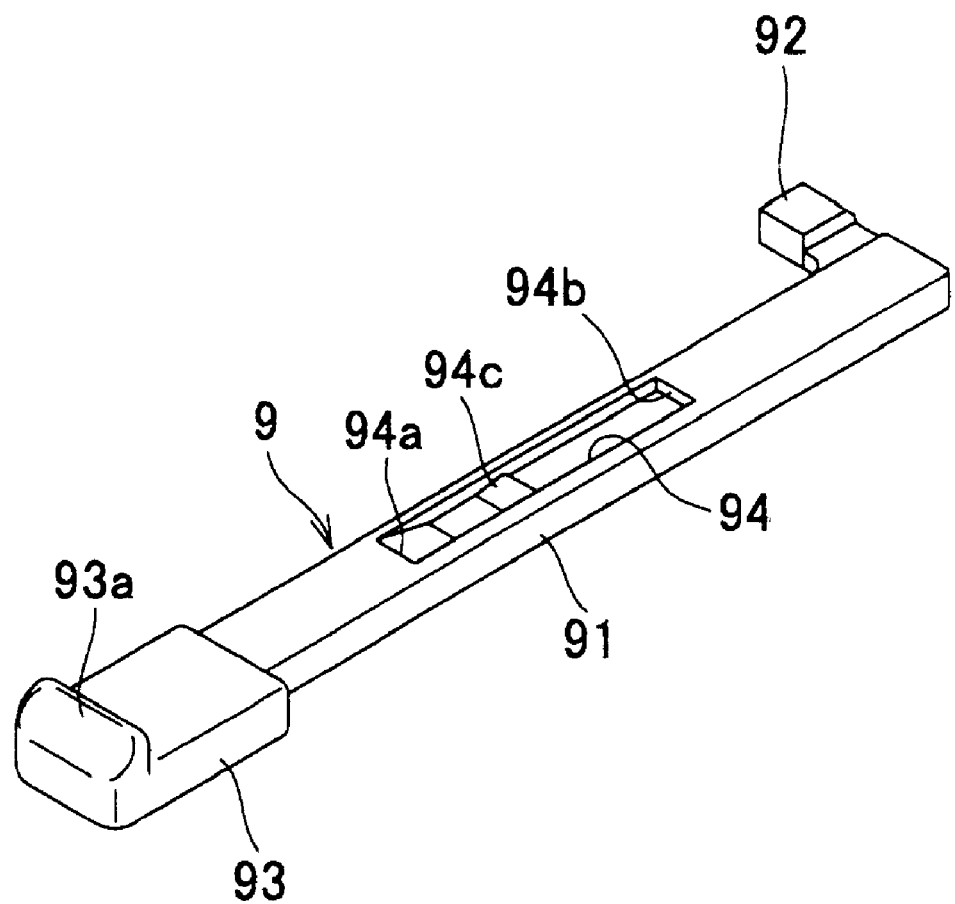
FIG. 6 is a perspective view of an ejection member of the card connector shown in FIG. 1.
Figure 7A:
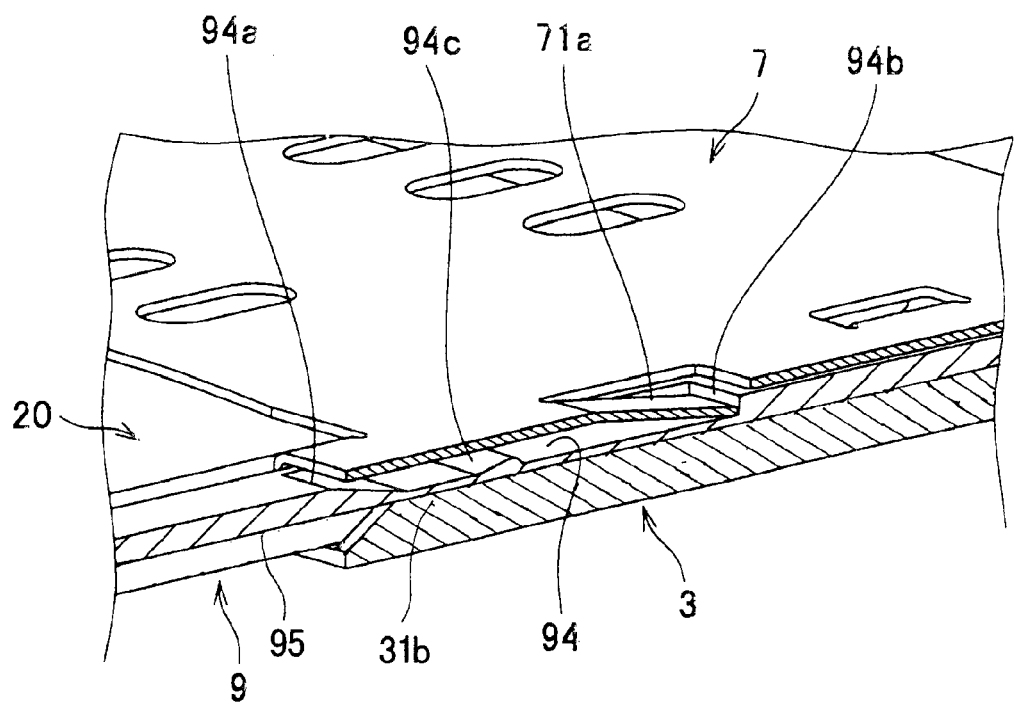
FIG. 7A is a cross-sectional view of the card connector shown in FIG. 1 in a state before the SIM card is connected thereto.
Figure 7B:
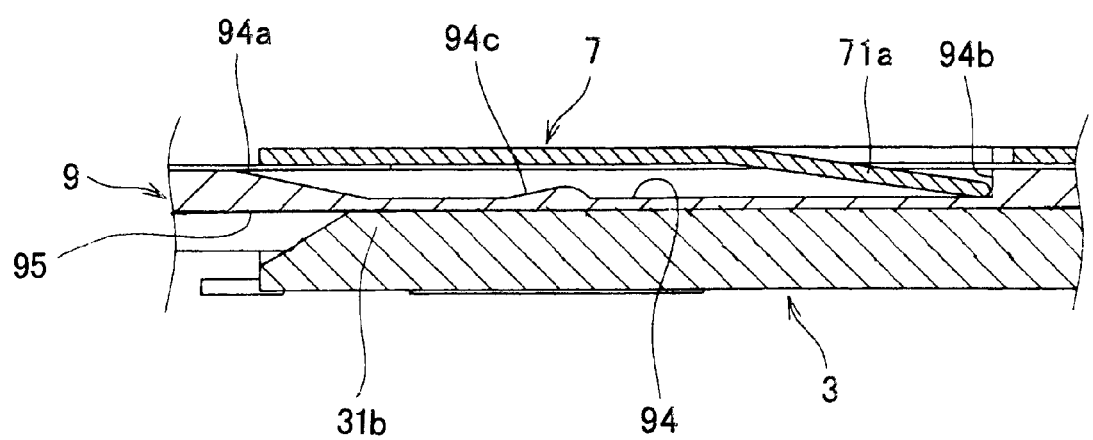
FIG. 7B is an enlarged cross-sectional view of the card connector in the same state as that shown in FIG. 7A.
Figure 8A:
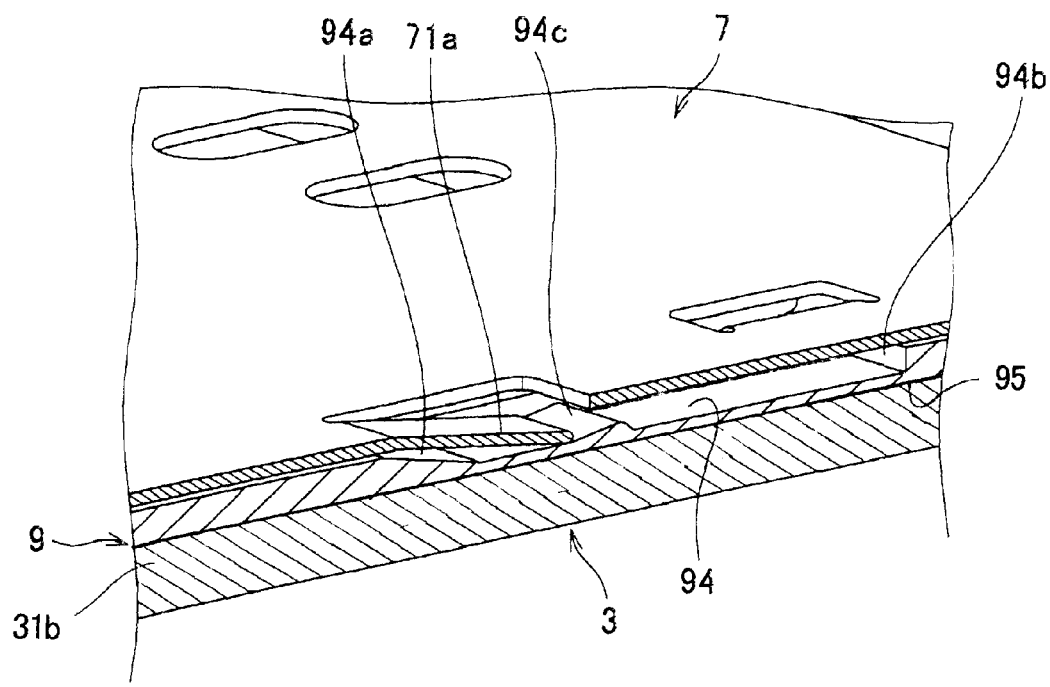
FIG. 8A is a cross-sectional view of the card connector shown in FIG. 1 in a state in which the SIM card is connected thereto.
Figure 8B:
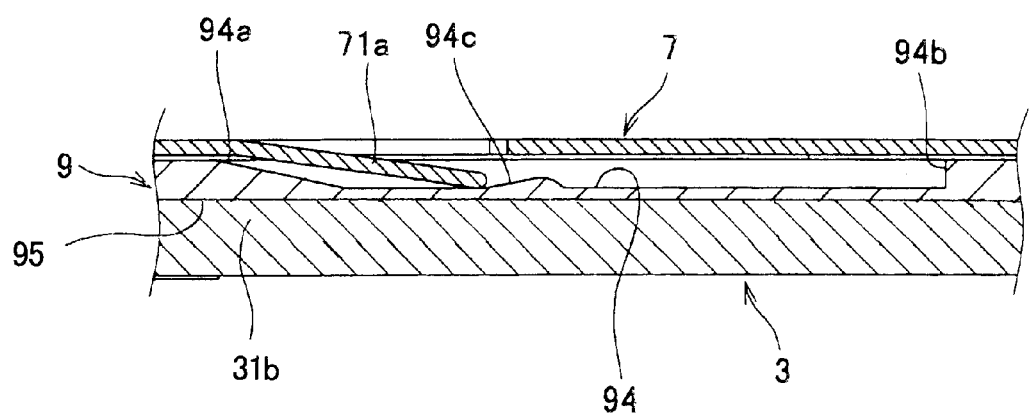
FIG. 8B is an enlarged cross-sectional view of the card connector in the same state as that shown in FIG. 8A.
Figure 9A:
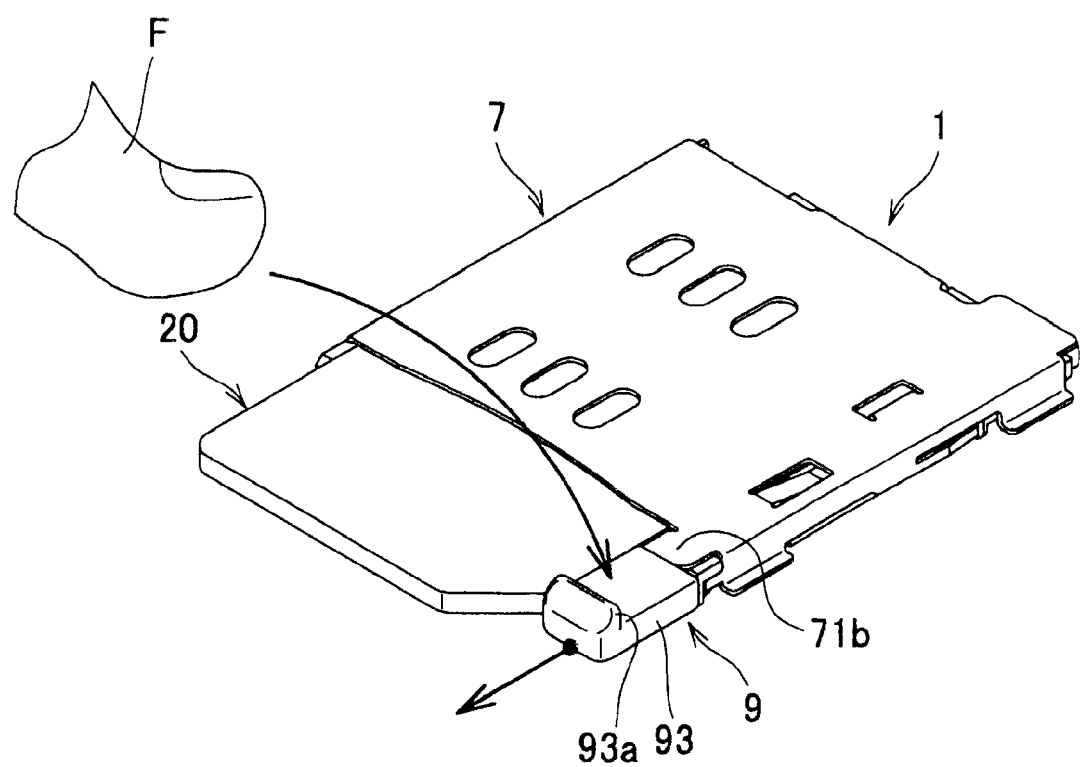
FIG. 9A is a perspective view of the card connector shown in FIG. 1 in a state before the SIM card connected thereto is pulled out.
Figure 9B:
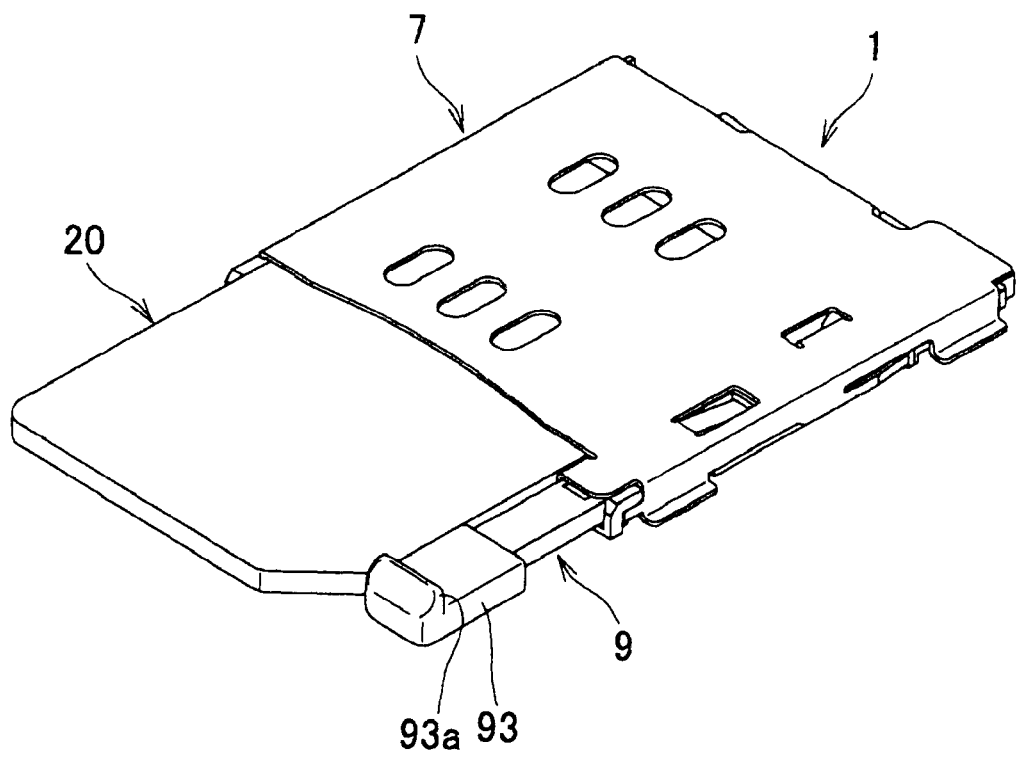
FIG. 9B is a perspective view of the card connector in a state in which the SIM card is pulled out therefrom.

DESCRIPTION OF REFERENCE NUMERALS 1 card connector (connector)
3 housing
31b guide portion (housing-side guide portion)
5 contact
7 cover
71a spring portion
71c, 71d guide portion (cover-side guide portion)
9 ejection member
91 main body portion
92 abutment portion
93 operation button (operation portion)
94 groove
94b terminating end (stopper portion)
94c protruding portion
95 guide groove

The invention claimed is:

1. A connector comprising:
a housing that holds contacts;
a cover that covers said housing; and
an ejection member that is movably held by said housing and said cover and ejects a card-type electronic component inserted between said housing and said cover,
wherein said cover includes a spring portion that urges said ejection member toward said housing,
wherein said ejection member includes a main body portion that is substantially bar-shaped, an abutment portion that is formed on one end of said main body portion and is brought into abutment with a front end of the card-type electronic component when ejecting the card-type electronic component, an operation portion that is formed on the other end of said main body portion and performs an operation for ejecting the card-type electronic component, and a groove that is formed in said main body portion and receives said spring portion of said cover in a relatively movable manner,
wherein said ejection member is a single component, and
wherein said groove is formed with a stopper portion that limits a movement of said ejection member in an ejecting direction of the card-type electronic component to a predetermined amount by abutment with a front end of said spring portion of said cover.

2. The connector as claimed in claim 1, wherein said housing includes a housing-side guide portion that guides said ejection member in an inserting direction or the ejecting direction of the card-type electronic component, and
wherein said ejection member includes a guide groove into which said housing-side guide portion is inserted.

3. The connector as claimed in claim 1, wherein said cover includes a cover-side guide portion that guides said ejection member in an inserting direction or the ejecting direction of the card-type electronic component and guides said card-type electronic component in the inserting or the ejecting direction thereof in concert with a side wall portion of said housing.

4. The connector as claimed in claim 3, wherein said housing includes a housing-side guide portion that guides said ejection member in the inserting or the ejecting direction of the card-type electronic component, and
wherein said ejection member includes a guide groove into which said housing-side guide portion is inserted.

5. The connector as claimed in claim 1, wherein said groove is formed with a protruding portion that increases an elastic deformation amount of said spring portion of said cover when said ejection member is pushed in an inserting direction of the card-type electronic component by not less than a predetermined amount.

6. The connector as claimed in claim 5, wherein said cover includes a cover-side guide portion that guides said ejection member in the inserting or the ejecting direction of the card-type electronic component and guides said card-type electronic component in the inserting or the ejecting direction thereof in concert with a side wall portion of said housing.

7. The connector as claimed in claim 6, wherein said housing includes a housing-side guide portion that guides said ejection member in the inserting or the ejecting direction of the card-type electronic component, and wherein said ejection member includes a guide groove into which said housing-side guide portion is inserted.

8. The connector as claimed in claim 5, wherein said housing includes a housing-side guide portion that guides said ejection member in the inserting or the ejecting direction of the card-type electronic component, and wherein said ejection member includes a guide groove into which said housing-side guide portion is inserted.

* * * * *